United States Patent [19]
Marucchi-Soos et al.

[11] Patent Number: 5,922,488
[45] Date of Patent: Jul. 13, 1999

[54] CO-TOLERANT FUEL CELL ELECTRODE

[75] Inventors: Elise Marucchi-Soos, Warren; David Terence Buckley, Somerville; Richard James Bellows, Hampton, all of N.J.

[73] Assignee: Exxon Research and Engineering Co., Florham Park, N.J.

[21] Appl. No.: 08/912,878

[22] Filed: Aug. 15, 1997

[51] Int. Cl.⁶ ........................................... H01M 4/86
[52] U.S. Cl. .............. 429/44; 429/40; 204/294; 204/291; 205/101; 205/313; 205/305; 205/325; 205/339; 427/115; 427/126.5; 427/419.2
[58] Field of Search ............... 429/40, 44; 204/294, 204/291; 502/101, 182, 185, 300, 305, 313, 325, 339; 427/419.2, 126.5, 115

[56] References Cited

U.S. PATENT DOCUMENTS 5,225,391  7/1993  Stonehart et al. ................ 502/324
5,298,343  3/1994  Savadogo et al. ................. 429/44
5,470,673  11/1995  Tseung et al. .................... 429/44

OTHER PUBLICATIONS

Anodic Oxidation of Methanol on Pt/WO₃ in Acidic Media, P. K. Shen and A. C. C. Tseung, J. Electrochem. Soc., vol. 141, No. 11, p. 3082–3090; Nov. 1994.

*Primary Examiner*—Bruce F. Bell

[57] ABSTRACT

The invention is directed towards a CO-tolerant fuel cell electrode formed from a carbon supported, platinum dispersed, non-stoichiometric hydrogen tungsten bronze electrode catalyst. The electrode catalyst is capable of oxidizing CO at very low potentials, and is sequentially formed from stable precursors.

8 Claims, 4 Drawing Sheets

CO-TOLERANT FUEL CELL ELECTRODE

FIELD OF THE INVENTION

The invention is related generally to fuel cells. More specifically, the invention is related to fuel cell electrodes.

BACKGROUND OF THE INVENTION

Fuel cells produce electricity by converting reactants such as hydrogen and oxygen into products such as water. A fuel cell comprises a negative electrode, called a cathode; a positive electrode, called an anode; and an electrolyte situated between the two electrodes. During operation a voltage is produced between the anode and the cathode.

One fuel cell system having a potential for great practical importance uses an anode containing platinum, polymer electrolytes, and fuels derived from liquid hydrocarbons. A partial oxidation reaction chemically transforms the hydrocarbons into the desired reactant, hydrogen, and into undesirable carbon monoxide and nitrogen byproducts. The hydrogen ions present at the anode travel across a polymer electrolyte to the cathode. Upon reaching the cathode, the hydrogen ions react with oxygen present at the cathode and electrons from the external circuit to produce water and an external electric current produced by the voltage difference between the anode and cathode.

The liquid hydrocarbon fueled fuel cell scheme is a promising power source for electric vehicles because its fuels are readily available, inexpensive, and easily transported. This scheme requires no special provisions for on-board storage of the liquid hydrocarbon fuels beyond those already present on vehicles using these fuels to power internal combustion engines. Additionally, the existing motor fuel refining, storage, and delivery infrastructure already provides a supply of these fuels for transportation purposes.

Increasing the voltage between the anode and cathode is one way of enhancing a fuel cell's performance. Such a voltage increase can be obtained when the fuel cell electrodes are formed from catalytic materials. However, when catalytic poisons such as CO are present in the fuel, the anode to cathode voltage decreases. This in turn undesirably reduces the current flowing in the external circuit.

Hydrogen-oxygen fuel cells having platinum-containing catalytic anodes exhibit a measurable decrease in fuel cell voltage in cases where CO levels exceed about 1 to 5 ppm in the hydrogen fuel. It is believed that this decrease is caused by the additional electric potential needed at the anode to oxidize the carbon monoxide into carbon dioxide. This decrease in fuel cell voltage is frequently referred to as an activation overpotential.

As electric current is made available to the external circuit, the overpotential increases, and consequently decreases the fuel cell's effectiveness as a generator of electric energy.

Methods for reducing the effect of CO poisoning of fuel cell electrodes are known in the art. Some methods concentrate on processing the hydrogen fuel so as to remove as much CO as possible. Sometimes fuel treatment methods are combined in order to achieve greater effectiveness. One fuel processing method is called a water gas shift reaction, which reacts a mixture of CO and hydrogen with steam to reduce the fuel's CO concentration; unfortunately, equilibrium constraints limit conversion in the bulky water gas shift reactors so that at best the hydrogen fuel still contains between about 0.5 and 1% CO. Another method called preferential partial oxidation selectively oxidizes CO in the presence of hydrogen and can reduce the fuel's CO content, but the preferential oxidation scheme also has serious difficulties. For example, oxygen must be added during the preferential oxidation reaction resulting in the undesirable oxidation of hydrogen fuel into water. Even when preferential oxidation and water gas shift are used in combination under transient conditions, those processes result in a hydrogen fuel containing excessive CO impurities.

Other methods for reducing the effect of CO impurities on fuel cell voltage use CO-tolerant fuel cell electrodes. The amount of activation overpotential that develops at an electrode in the presence of CO impurities depends on the electrode potential that the anode requires to oxidize the adsorbed carbon monoxide. Changing the composition, electronic structure, and physical structure of the anode material can affect the amount of electrode potential required to oxidize the carbon monoxide.

Both Pt/Ru and Pt/Sn electrodes are known to exhibit CO oxidation activity at potentials lower than those observed with pure platinum electrodes. However, it is believed that electrodes made from these materials cannot tolerate CO concentrations in the hydrogen fuel in excess of about 10 ppm without exhibiting CO activation polarization. This CO tolerance is less than that needed for practical fuel cell use. Further, the observed CO activation polarization results in a 200 to 500 mV reduction in fuel cell voltage in a cell made with electrodes fabricated using these materials, thereby reducing the cell's effectiveness as an electric power generator.

Platinum particles dispersed in non-stoichiometric hydrogen tungsten bronzes are candidate electrodes for use in fuel cells. See for example, U.S. Pat. No. 5,470,673, where the electrocatalytic capability of platinum-dispersed, nonstoichiometric hydrogen tungsten bronzes and their use as fuel cell electrodes in carbon monoxide based fuel cells is discussed. However, the platinum-dispersed, non-stoichiometric hydrogen tungsten bronzes of that reference are prepared by co-electrodeposition or co-deposition processes that do not directly control the dispersion of platinum. Ideally, 50% or more of the platinum should be in the form of surface platinum. This requires platinum dispersion resulting in platinum crystals having a diameter ranging from about 20 Å to about 30 Å; whereas co-electrodeposition according to the method of U.S. Pat. No. 5,470,673 results in platinum crystals with a diameter of about 40 Å. See Shen, et al. in J. Electrochem. Soc., 142, 3082–3090, 1994.

Platinum dispersed, non-stoichiometric hydrogen tungsten bronzes can also be prepared using simultaneous electrochemical techniques. See for example, Kulesza et al. in J. Electrochem. Soc., 136, 707–713, 1989. That these methods also result in insufficient platinum dispersion is shown by the reported platinum particle diameters ranging from about 1000 Å to about 2000 Å.

An additional disadvantage attendant to both co-electrodeposition and simultaneous electrochemical deposition is the use of unstable precursors in forming platinum-dispersed, non-stoichiometric hydrogen tungsten bronzes.

Freeze drying is another method for preparing platinum-dispersed, non-stoichiometric hydrogen tungsten bronzes. See for example, Chen, et al. in J. Electrochem Soc., 142,1185–187, 1995. It is known, however, that freeze drying does not produce uniformly small platinum crystals.

The formation of platinum-dispersed, non-stoichiometric hydrogen tungsten bronze having uniformly small dispersed platinum particles can occur according to sequential preparation methods. See for example U.S. Pat. No. 5,298,343. Sequential preparation occurs when an oxidized tungsten species is deposited on a carbon-supported platinum electrode catalyst, and then in a separate step the oxidized tungsten species is reduced thereby forming a non-stoichiometric hydrogen tungsten bronze.

While sequential preparation methods are known, the reference teaches that the resulting materials are suitable for reducing $O_2$ at the cathode of a phosphoric acid fuel cell and not for oxidizing CO or hydrogen at the anode of a polymer electrolyte fuel cell. Additionally, the support material of that reference is in the form of a tungsten oxide and not a non-stoichiometric hydrogen tungsten bronze.

Consequently there is a need for a CO-tolerant anode material formed from stable precursors having platinum particles dispersed in a non-stoichiometric hydrogen tungsten bronze that is capable of oxidizing carbon monoxide at low potential energy thereby minimizing the undesirable overpotential.

SUMMARY OF THE INVENTION

The present invention is directed towards a carbon-supported, platinum-dispersed, non-stoichiometric hydrogen tungsten bronze having the formula Pt—$H_xWO_3$ wherein x ranges from about 0.05 to about 0.36, formed from platinum particles ranging in size from about 20 Å to about 30 Å on a carbon support, the carbon being in the form of high surface area carbon having surface area ranging from about 100 to about 500 $M^2$/gm, and the platinum particles being dispersed in an amount ranging from about 10 to about 40 wt % on the carbon, the carbon-supported platinum-dispersed, non-stoichiometric hydrogen tungsten bronze being formed by:

(a) depositing on the carbon support a tungsten oxide source selected from the group of pertungstic acid; tungsten compounds having the formulas $WO_3$, $H_2WO_4$, $WO_2$, and, $Na_2WO_4$; and mixtures thereof thereby forming a composition, and then (b) reducing the tungsten oxide for a time ranging from about 1 hour to about 4 hours, at a temperature ranging from about 250° C. to about 350° C., in the presence of hydrogen at a pressure ranging from about 1 atmosphere to about 10 atmospheres.

BRIEF DESCRIPTION OF THE DRAWINGS

The accompanying drawings, which are incorporated in and form a part of the specification, illustrate the embodiments of the present invention and, together with the description, serve to explain the principles of the inventions. In the drawings.

DETAILED DESCRIPTION OF THE INVENTION

Figures 1, 1A, 1B:
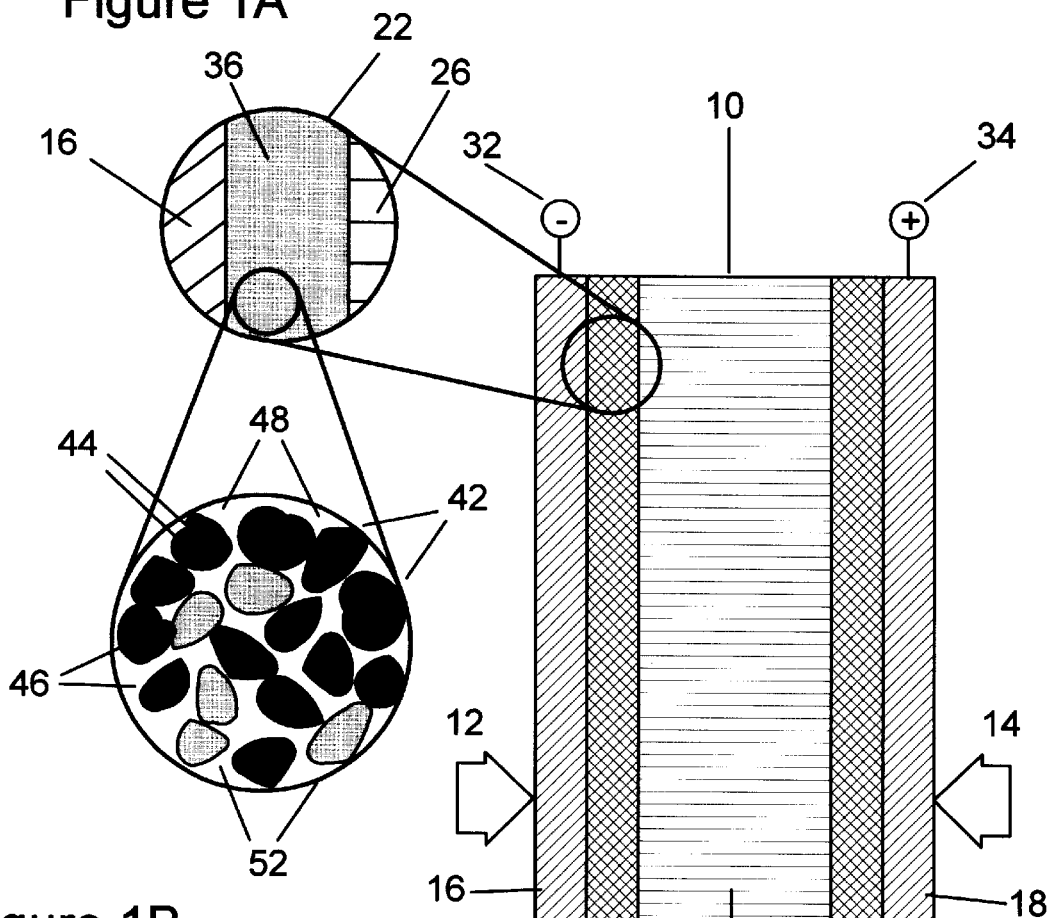
FIG. 1 is a schematic cross-section of a fuel cell showing a membrane electrode assembly (MEA) structure in accordance with one embodiment of the present invention.
FIG. 1A is a pictorial representation showing a magnified view of Pt/C catalysts between the anode backing layer and the polymer electrolyte membrane of the MEA structure.
FIG. 1B is an illustration of a magnified view of a portion of FIG. 1A.

In one embodiment, the invention is a platinum-dispersed, non-stoichiometric hydrogen tungsten bronze (represented by Pt—$H_xWO_3$ wherein x ranges from 0.05 to about 0.36) sequentially formed on a carbonaceous support. The composition is sequentially formed on a carbonaceous support from stable precursors and has highly dispersed, uniformly small platinum particles. This supported composition is represented by Pt—$H_xWO_3$/C. In another embodiment, the invention is a fuel cell having a Pt—$H_xWO_3$/C electrode catalyst capable of oxidizing CO at very low potentials. In still another embodiment, the invention is an electric power generator comprising such a fuel cell.

In one embodiment, the invention is a platinum-dispersed, non-stoichiometric hydrogen tungsten bronze formed using a carbon-supported platinum catalyst. Accordingly, a carbon-supported platinum catalyst is prepared or obtained. The platinum should be in the form of platinum particles having diameters ranging in size from about 20 Å to about 30 Å. The platinum is completely dispersed on the carbon support. Such materials are available commercially, for example 20 wt % Pt on Vulcan XC-72 catalyst powder produced by E-TEK, Inc of Natick, Mass. An oxidized tungsten species selected from the group consisting of oxidized tungsten having the formulas $WO_3$, $H_2WO_4$, $WO_2$, $Na_2WO_4$ or pertungstic acid is then admixed with or impregnated into the previously prepared carbon-supported platinum (Pt/C) catalyst. Mixtures of these tungsten oxide species may also be used in the deposition. The deposited oxidized tungsten is then reduced thereby forming a non-stoichiometric hydrogen tungsten bronze. This preparation is referred to as a sequential preparation because it comprises three distinct successive steps: dispersing platinum particles on a support, depositing a tungsten oxide species onto the support or impregnating the species into the support, and then reducing the tungsten oxide species thereby forming a platinum-dispersed, non-stoichiometric hydrogen tungsten bronze. It is not critical to optimally disperse the tungsten species.

The resulting composition can be formed into an ink, as exemplified below, which is then deposited onto a suitable fuel cell electrode material such as carbon fiber. The inked electrode is especially suitable for use as an electrode catalyst in fuel cells utilizing hydrogen ($H_2$) feeds containing carbon monoxide (CO) impurities.

The platinum-dispersed, non-stoichiometric hydrogen tungsten bronzes are prepared on the Pt/C catalyst using stable precursors. Precursors based on stable solutions of $NaWO_4$ or pertungstic acid are preferred over less stable precursors (as described below) such as those solutions used in the simultaneous deposition and reduction of soluble Pt and W salts.

TUNGSTEN DEPOSITION AND REDUCTION PROTOCOLS

PROTOCOL I

1. Disperse platinum particles ranging in size from about 20 Å to about 30 Å on to a carbon support such as Vulcan XC-72.

2. Dissolve tungsten metal to form a soluble pertungstate species by adding an amount of tungsten powder ranging from about 5 wt % to about 30 wt % to a 30 wt % hydrogen peroxide solution wherein the wt % of added tungsten is based on the total weight of tungsten and 30% hydrogen peroxide. This produces a pertungstic acid colloid.

3. Impregnate the 20% platinum on carbon (20% Pt/C) catalyst wherein the dispersed platinum particles range in size from about 20 Å to about 30 Å with the pertungstate colloid by incipient wetness impregnation. Dilute the pertungstic acid colloid with distilled water prior to impregnation as required to achieve the desired W/Pt atomic ratio, which should range from about 0.1 to about 3.0.

4. Dry the tungsten-impregnated Pt/C in drying oven at 110° C. for ½ hour.

5. Reduce the tungsten impregnated Pt/C in hydrogen at a temperature ranging from about 250° C. to about 350° C., pressure ranging from about 1 atmosphere to about 10 atmospheres, and for a time ranging from about 1 hour to about 4 hours.

PROTOCOL II

1. Form 20% Pt/C as described in Protocol I.

2. Use incipient wetness techniques to impregnate the Pt/C catalyst with an amount of an aqueous $Na_2WO_4$ solution sufficient to form a mixture with a W/Pt ratio ranging from about 0.1 to about 3.0.

3. Dry W impregnated Pt/C in drying oven 110° C. for ½ hour.

4. Acidify $Na_2WO_4$ impregnated catalyst with an aqueous sulfuric acid solution wherein the amount of $H_2SO_4$ is slightly in excess of stoichiometric to the amount of $Na_2WO_4$.

5. Dry the tungsten-impregnated Pt/C in a drying oven 110° C. for ½ hour.

6. Reduce the tungsten impregnated Pt/C in hydrogen at a temperature ranging from about 250° C. to about 350° C., pressure ranging from about 1 atmosphere to about 10 atmospheres, and for a time ranging from about 1 hour to about 4 hours.

PROTOCOL III

1. Form 20% Pt/C as described in Protocol I.

2. Use incipient wetness techniques to impregnate the Pt/C with an aqueous $Na_2WO_4$ solution in an amount resulting in a W/Pt ratio ranging from about 0.1 to about 3.0.

3. Acidify the $Na_2WO_4$ impregnated Pt/C with diluted $H_2SO_4$. The amount of $H_2SO_4$ is slightly in excess of stoichiometric to the amount of $Na_2WO_4$.

4. Rinse the tungsten-impregnated Pt/C with a minimal volume of dilute sulfuric acid to remove any $Na_2SO_4$.

5. Filter the tungsten-impregnated Pt/C to remove excess moisture from catalyst.

6. Reduce the tungsten impregnated Pt/C in hydrogen at a temperature ranging from about 250° C. to about 350° C., pressure raging from about 1 atmosphere to about 10 atmospheres, and for a time ranging from about 1 hour to about 4 hours.

PROTOCOL IV

1. Form a material according to Protocol I steps 1, 2 and 3; Protocol II steps 1, 2, 3 and 4; or Protocol III steps 1, 2, 3 and 4. It is not necessary to dry or reduce the material.

2. Form an ink by combining the material of step 1 with a suitable dispersing agent such as water, isopropyl alcohol, and mixtures thereof, and a polymeric binder such as PTFE, perfloursulfonic acid polymer, and mixtures thereof.

3. Apply the ink to a fibrous carbonaceous material thereby forming an electrode catalyst.

4. Configure the electrode catalyst as the anode of a MEA fuel cell as shown in FIG. 1 and described in detail below. Reduce the electrode catalyst in the fuel cell by exposing the anode to a gas containing hydrogen and water. During reduction, fuel cell temperature should range from ambient to about 120° C., hydrogen partial pressure should range from about 0.5 atm to about 10 atm, and water partial pressure from about 20 torr to about 3 atm, respectively.

All the protocols require reducing tungsten oxides to non-stoichiometric hydrogen tungsten bronzes after depositing the tungsten oxides on the carbon-supported platinum catalyst. This reduction may be completed prior to fabricating the catalyst into an electrode, or alternatively "in situ" in the fuel cell when the catalyst is first exposed to $H_2$ containing gases.

The following text illustrates the properties of the platinum-dispersed, non-stoichiometric hydrogen tungsten bronze compositions formed according to the protocols. The text also illustrates the use of those compositions in fuel cells.

FIGS. 1, 1A and 1B show in pictorial cross section form a fuel cell having an electrode structure according to the present invention. Fuel cell assembly 10 includes gaseous reactants which include a fuel source 12 and an oxidizer source 14. The gases 12, 14 diffuse through anode backing layer 16 and cathode backing layer 18, respectively, to porous catalytic electrodes forming anode 22 and cathode 24. Anode 22 is separated from cathode 24 by a solid polymer electrolytic (SPE) membrane 26. SPE membrane 26 provides for ion transport from gas reactions arising in anode 22 and cathode 24. Anode connection 32 and cathode connection 34 are used to interconnect with an external circuit or with other fuel cell assemblies.

FIG. 1A is a magnified view of anode 22 of FIG. 1. Porous catalytic gas diffusion electrode 36 is supported on cathode backing layer 16 and in contact with solid polymer electrolytic membrane 26. A gaseous reactant diffuses through backing layer 16 and into porous catalytic electrode 36. Referring now to FIG. 1B, a further magnified view of a porous catalytic gas diffusion electrode in accordance with one embodiment of the present invention is presented. Porous support particles 42 are provided for catalyst materials 44 which are preferably dispersed on the surface of porous support particles 42. Support particles 42 define interstitial pores 48 which enable gases to penetrate within the electrode structure for electrochemical reactions to occur adjacent to catalyst 44.

Additional particles 52 may be provided to control the wetting properties of the electrode and to help maintain porosity and strength. More particularly, Teflon® (E. I. duPont) maybe included to provide hydrophobicity and gas access with the electrode.

In the present invention proton conducting material 46 is provided within the structure of porous gas diffusion electrode 36. Material 46 may be partially impregnated into the pores of support particles 42. Proton conductor 46 enables protons to be conducted between catalytic sites 44 on surfaces defining interstices 48 and SPE membrane 26.

The membrane electrode assembly (MEA) comprises a proton conducting membrane 26 that is covered on each side by both an anode catalyst layer 22 and a cathode catalyst layer 26. Gaseous reactants are fed to each side of this MEA in a fuel cell through anode backing layer 16 and cathode backing layer 18.

FIG. 1B illustrates how platinum is distributed on supports in fuel cell anode catalysts that are known in the art, typically Pt/C or Pt—Ru supported on carbon (designated as Pt—Ru/C). The particles illustrated represent the carbon support material. Platinum or platinum-ruthenium particles, represented by the dark specs 44 are dispersed within the carbon support 42. It is believed that the dispersed platinum or Pt—$H_xWO_3$ of the present invention is dispersed on the carbon support in a similar fashion.

Figure 2:
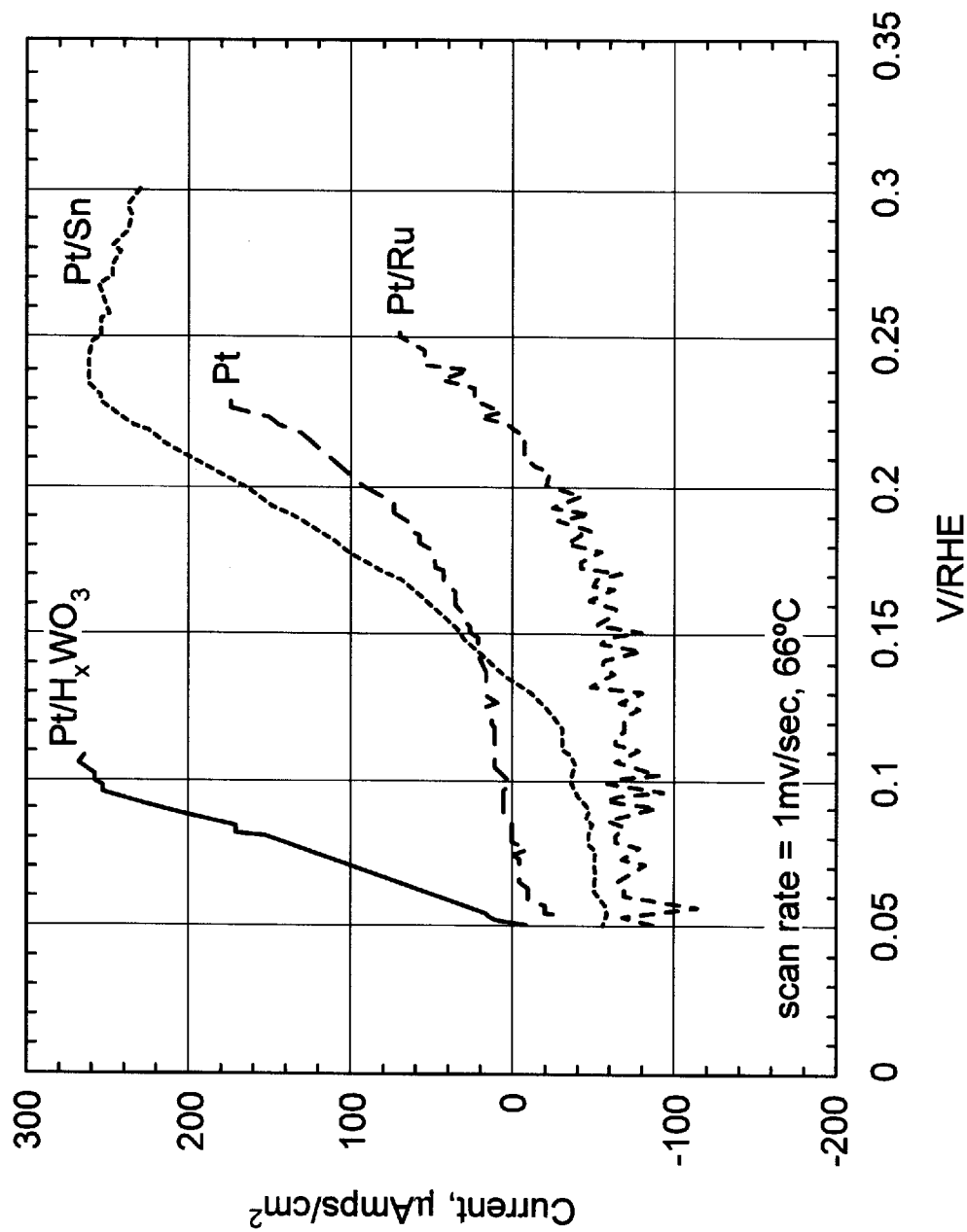
FIG. 2 is a comparison of the CO oxidation activity for unsupported Pt—$H_xWO_3$ catalyst vs. potential compared with the activity of Pt, Pt—Sn, and Pt—Ru catalysts.

FIG. 2 compares the carbon-supported Pt—$H_xWO_3$ catalyst of this invention with CO-tolerant anode catalysts formed by other means. All catalysts were supported on a glassy carbon rod having a superficial area of 0.2 $cm^2$. The comparison electrode catalysts were prepared by coelectrodeposition from solutions containing soluble precursors according to methods known in the art and described in the Background. The comparison electrode had Pt surface roughness factors of 50–100 $cm^2/cm^2$, as estimated from the adsorbed surface hydrogen peaks on the pure Pt example. CO oxidation experiments were performed in a three electrode electrochemical cell using a 1 N $H_2SO_4$ electrolyte saturated with 1 atmosphere of CO at a temperature of about 60° C. The reference electrode was a reversible hydrogen electrode (RHE). The Pt—$H_xWO_3$ example begins to significantly oxidize CO at a potential of 50–75 mV while the other catalysts do not show equivalent CO oxidation until 150–200 mV for Pt—Sn, 200–250 mV for Pt—Ru and 150–200 mV for Pt, respectively. FIG. 2 shows that Pt—$H_xWO_3$ is a superior catalyst for oxidizing CO. High CO oxidation activity is a critical characteristic which enables fuel cell catalysts to show superior performance when using impure $H_2$ containing CO impurities.

Figure 3:
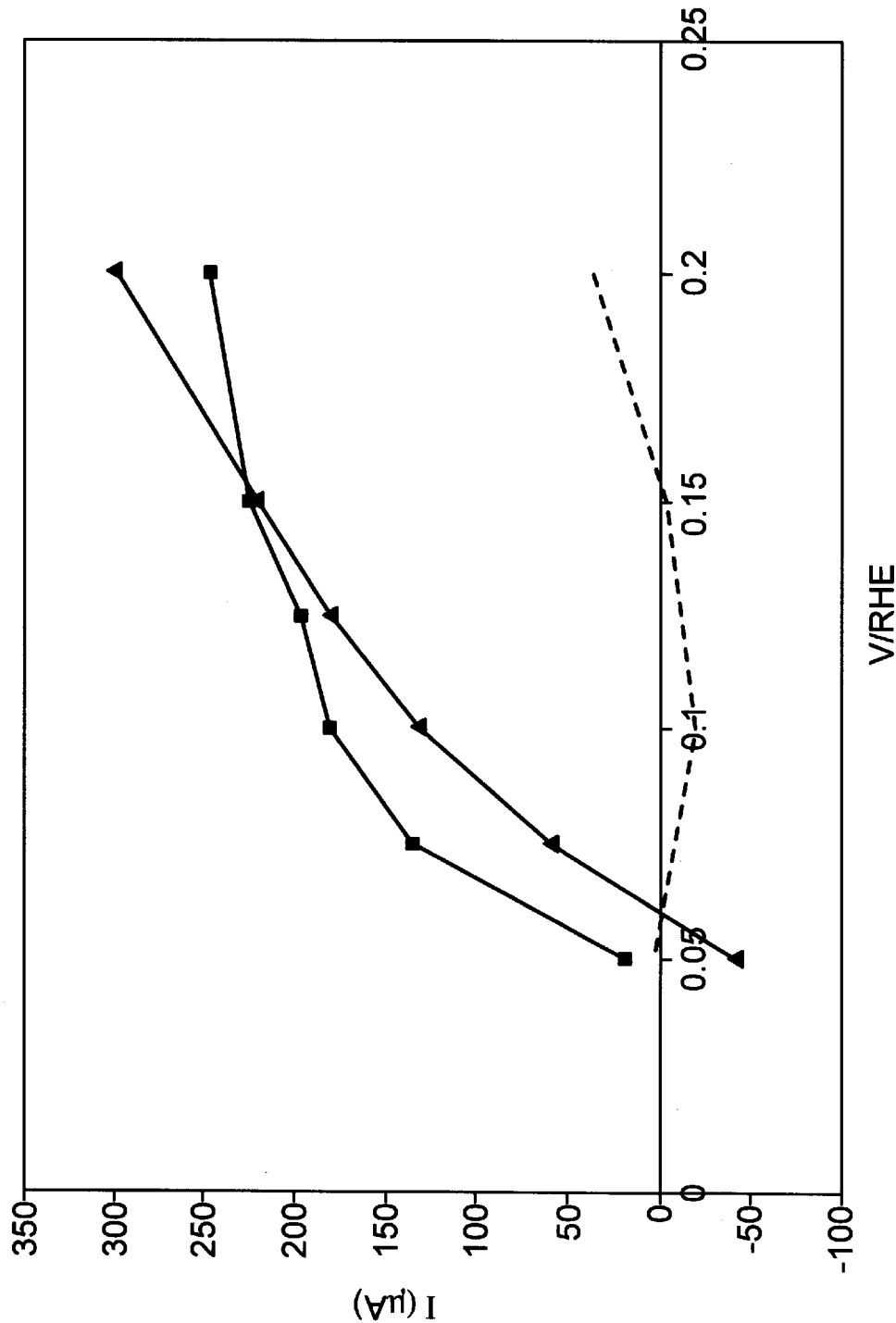
FIG. 3 is a comparison of the CO oxidation activity for Pt—$H_xWO_3$/C catalysts using various preparation protocols. This activity is also compared with the activity of Pt on carbon supported (designated as Pt/C) catalyst.

FIG. 3 is a comparison of the CO oxidation activity for Pt—$H_xWO_3$/C catalysts prepared using protocols I (triangular points) and II (rectangular points). Activity is also compared with the activity of Pt/C catalyst (dashed line). The CO oxidation currents are expressed per $cm^2$ of surface Pt as estimated from Pt oxide peaks. In these experiments the various Pt—$H_xWO_3$/C catalysts and the commercial Pt/C catalysts were used to prepare inks. Each ink was prepared by combining 0.15 gm of the catalyst powder with an aqueous 20 wt % PTFE dispersion (diluted 60% PTFE, purchased from ElectroChem, Woburn, Mass.), 1 ml of water and 1 ml of isopropanol. The mixture was subjected to ultrasonic shearing forces for ½ hour or until a thick homogeneous mixture was formed. A small amount of the ink was then painted onto a carbon fiber cloth and dried. Typical Pt loadings were about 2 mg Pt/$cm^2$. The superficial painted area was approximately 1 $cm^2$. Each electrode was tested in a three electrode electrochemical cell having 1 N $H_2SO_4$ electrolyte saturated with 1 atmosphere CO at temperatures near 60° C. The reference electrode was a reversible hydrogen electrode (RHE). The Pt—$H_xWO_3$/C examples began to oxidize CO at a potential of 50–75 mV/RHE while the Pt/C catalyst does not show equivalent CO oxidation until 150–200 mV. This figure shows that Pt—$H_xWO_3$/C catalysts are superior to Pt/C catalysts for oxidizing CO.

Figure 4:
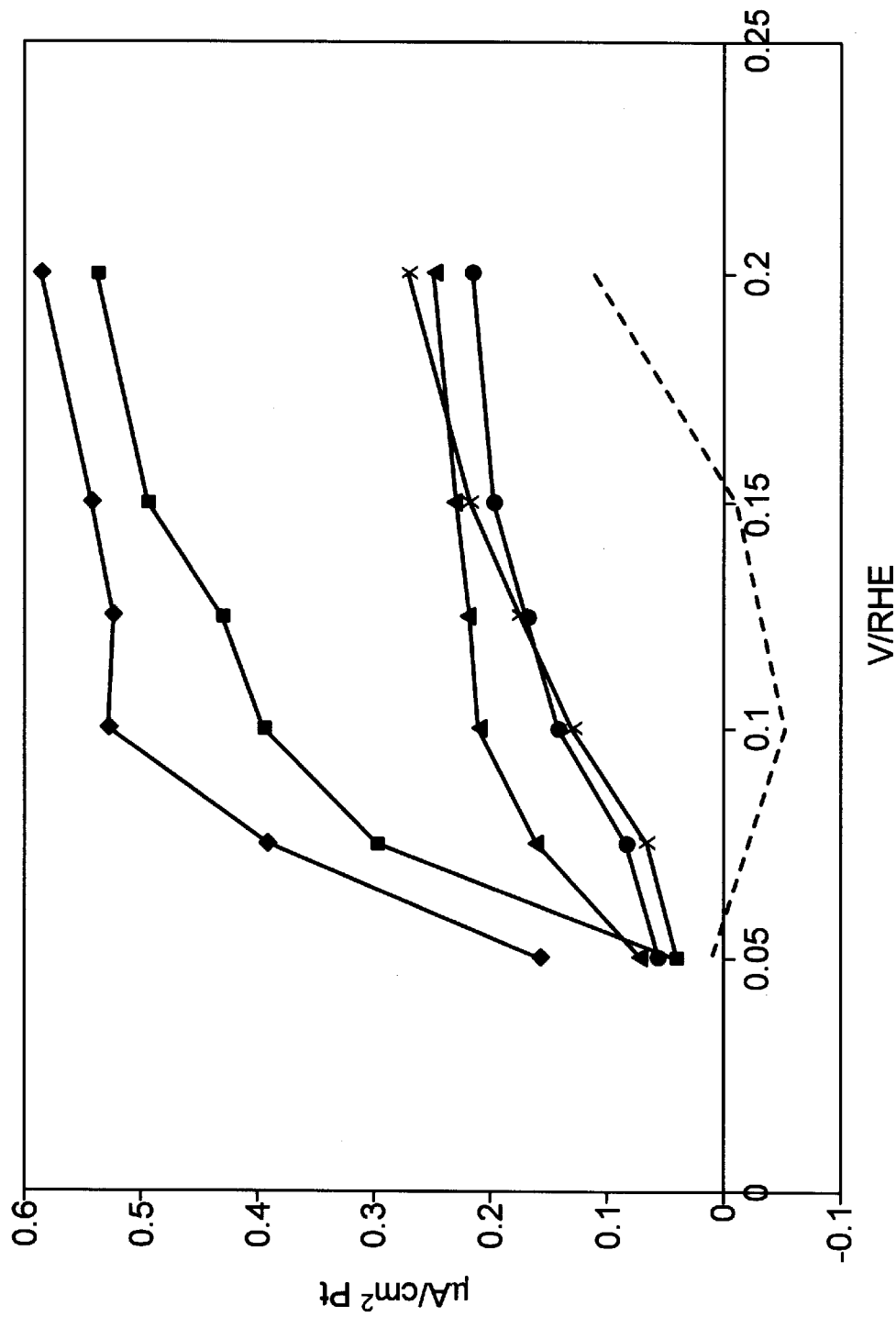
FIG. 4 is a comparison of the CO oxidation activity for Pt—$H_xWO_3$/C catalysts vs. potential, comparing the effect of W/Pt ratios for catalysts prepared by a single protocol.

FIG. 4 is a comparison of the CO oxidation activity for Pt—$H_xWO_3$/C catalysts prepared by Protocol II vs potential, showing the effect of changing the W/Pt ratio. This activity is also compared with the activity of Pt/C catalyst. These experiments were conducted under the same conditions as those in FIG. 3. Comparisons at 75 mV/RHE show that the CO oxidation current increases with increasing the ratios of W/Pt. Even very low ratios of W/Pt show that CO oxidation activity begins at lower potential than for the Pt/C catalyst. In FIG. 4, points represented by a diamond, rectangle, triangle, circle, and x correspond respectively to tungsten:platinum atomic ratios of 3, 1.0, 0.3, 0.1, and 0.01. The activity of the Pt/C catalyst is represented by a dashed line.

In the preferred embodiment, the invention is an electrode catalyst for use in fuel cells using impure $H_2$ containing CO impurities as a fuel source. In accordance with the preferred embodiment, platinum-dispersed, non-stoichiometric hydrogen tungsten bronzes are formed on previously prepared Pt/C catalysts. Fuel cell electrodes are then formed from this material. The preferred electrode is in an MEA of a fuel cell using a polymer electrolyte. Such fuel cells are known in the art in connection with other electrodes.

Polymer electrodes are preferred because Pt—$H_xWO_3$/C electrode catalysts exhibit a progressive decrease in CO oxidation performance above 25° C. when an aqueous electrolyte is used. While not wishing to be bound by any theory or model, this performance loss may result from the progressive loss of W from the catalyst. Scanning electron microscopy of the Pt/W catalysts on glassy carbon electrodes suggests that W is lost by progressive dissolution into the bulk aqueous sulfuric acid electrolyte. The use of these catalysts in the MEA of a polymer electrolyte fuel cell is the preferred embodiment because there is no bulk electrolyte in the polymer electrolyte fuel cell. The amount of available water is approximately 10,000 times less in the polymer electrolyte fuel cell than in fuel cells using aqueous sulfuric acid electrolytes.

What is claimed is:

1. A carbon-supported, platinum-dispersed, non-stoichiometric hydrogen tungsten bronze having the formula Pt—$H_xWO_3$ where x ranges from about 0.05 to about 0.36, formed by:
    (a) depositing a tungsten oxide source selected from the group consisting of pertungstic acid, $WO_3$, $H_2WO_4$, $WO_2$, $Na_2WO_4$, and mixtures thereof onto a carbon support, the carbon support having a surface area ranging from about 100 to about 500 $m^2$/gm and having platinum particles ranging in size from about 20 Å to about 30 Å dispersed thereon in an amount ranging from about 10 wt. % to about 40 wt. % based on the weight of the carbon, thereby forming a composition, and then
    (b) reducing the tungsten oxide source in a reducing atmosphere.

2. The carbon-supported, platinum-dispersed, non-stoichiometric hydrogen tungsten bronze of claim 1 wherein the reducing atmosphere includes hydrogen at a pressure ranging from about 1 atmosphere to about 10 atmospheres.

3. The carbon-supported, platinum-dispersed, non-stoichiometric hydrogen tungsten bronze of claim 2 wherein the tungsten oxide source is reduced at a temperature ranging from about 250° C. to about 350° C. for a time ranging from about 1 hour to about 4 hours.

4. A fuel cell comprising the carbon-supported, platinum-dispersed, non-stoichiometric hydrogen tungsten bronze of claim 1.

5. The carbon-supported, platinum-dispersed, non-stoichiometric hydrogen tungsten bronze of claim 4 reduced in the fuel cell.

6. The carbon-supported, platinum-dispersed, non-stoichiometric hydrogen tungsten bronze of claim 1 further comprising dispersing the material of step (a) in a solvent and in the presence of a polymeric binder, and then applying the dispersion to a support prior to reducing.

7. A CO-tolerant fuel cell anode having the formula Pt—H$_x$WO$_3$ wherein X ranges from 0.05 to 0.36 and wherein the Pt:W atomic ratio ranges from about 0.01 to about 3.0 formed by:
   a) depositing a tungsten oxide source selected from the group consisting of pertungstic acid, WO$_3$, H$_2$WO$_4$, WO$_2$, and, Na$_2$WO$_4$, and mixtures thereof onto a carbon support, the carbon support having a surface area ranging from about 100 m$^2$/gm to about 500 m$^2$/gm and having platinum particles dispersed ranging in size from about 20 Å to about 30 Å dispersed thereon in an amount ranging from about 10 wt. % to about 40 wt. % based on the weight of the carbon, and then
   b) reducing the tungsten oxide source for a time ranging from about 1 hour to about 4 hours, at a temperature ranging from about 250° C. to about 350° C., in the presence of hydrogen at a pressure ranging from about 1 atmosphere to about 10 atmospheres.

8. A method for forming a carbon-supported, platinum-dispersed, non-stoichiometric hydrogen tungsten bronze comprising:
   (a) depositing a tungsten oxide source selected from the group consisting of pertungstic acid, WO$_3$, H$_2$WO$_4$, WO$_2$, and, Na$_2$WO$_4$, and mixtures thereof onto a carbon support, the carbon support having a surface area ranging from about 100 to about 500 m$^2$/gm and having platinum particles ranging in size from about 20 Å to about 30 Å dispersed thereon in an amount ranging from about 10 wt. % to about 40 wt. % based on the weight of the carbon, thereby forming a composition, and then
   b) reducing the tungsten oxide source for a time ranging from about 1 hour to about 4 hours, at a temperature ranging from about 250° C. to about 350° C., in the presence of hydrogen at a pressure ranging from about 1 atmosphere to about 10 atmospheres.

* * * * *